United States Patent
Loukianov et al.

(10) Patent No.: US 6,208,665 B1
(45) Date of Patent: *Mar. 27, 2001

(54) DATA SYNCHRONIZATION UNIT FOR A HEADEND

(75) Inventors: Dmitrii Loukianov, Chandler; Bijan Hakimi, Phoenix, both of AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,157

(22) Filed: Aug. 25, 1997

(51) Int. Cl.[7] .................................................. H04L 12/56
(52) U.S. Cl. ............................................ 370/486; 370/516
(58) Field of Search ................................ 348/12, 10, 7, 348/192, 423, 464, 347; 370/394, 508, 514, 516, 517, 458, 486, 487, 375

(56) References Cited

U.S. PATENT DOCUMENTS

| | | | |
|---|---|---|---|
| 5,640,388 | * | 6/1997 | Woodhead et al. .................. 370/468 |
| 5,666,358 | * | 9/1997 | Paratore et al. ...................... 370/347 |
| 5,835,493 | * | 11/1998 | Magee et al. ........................ 370/394 |
| 5,905,732 | * | 5/1999 | Fimoff et al. ........................ 370/516 |

* cited by examiner

*Primary Examiner*—Chau Nguyen
*Assistant Examiner*—Phuongchau Ba Nguyen
(74) *Attorney, Agent, or Firm*—Kenyon & Kenyon

(57) ABSTRACT

A data synchronization unit provides Time Division Multiple Access (TDMA) synchronization for a headend. The headend includes a network data source and transmits a plurality of data streams on a transmission medium. Included in the plurality of data streams is a first timing information element packet (TIE) generated by the network data source. The plurality of data streams are multiplexed by a multiplexer into a combined data stream. The data synchronization unit extracts the first timing packet from the combined data stream. The data synchronization unit then generates a second timing packet that compensates for a time delay of the multiplexer and inserts the second timing packet into the combined data stream in place of the first timing packet.

17 Claims, 5 Drawing Sheets

DATA SYNCHRONIZATION UNIT FOR A HEADEND

FIELD OF THE INVENTION

The present invention is directed to a data synchronization unit for a headend. More particularly, the present invention is directed to a data synchronization unit for a headend in a TDMA-based communication system that transmits timing information that is multiplexed with other data streams.

BACKGROUND OF THE INVENTION

Connecting a computer to the Internet and other public networks is an increasingly popular way for home computer users to receive multimedia information and communicate with other computer users. As a result, higher and higher data bandwidth is needed by home computer users. Many efforts are being made to use the already existing communication infrastucture to provide high-speed access to network services. The plurality of existing digital TV Hybrid Fiber/Coaxial ("HFC") cable networks is one of the most suitable communication mediums available to home users for connecting to the Internet.

An HFC headend is the originating point of a signal in an HFC cable network, and it is also responsible for maintaining synchronization among the users to ensure that they do not create contentions in the distributed system when attempting to send data to the headend via a shared transmission medium. The synchronization is difficult because it must account for variable and differing data propagation delays.

FIG. 1 is a block diagram that illustrates a typical headend for providing Internet access to a plurality of user computers, referred to as "client computers". In FIG. 1, a headend 10 is coupled to an Internet access point 12. Headend 10 transmits a packet data stream 32 over a transmission medium 30 to client computers 21–24. In the embodiment shown in FIG. 1, headend 10 is adapted for a HFC cable system, so transmission medium 30 is an optical and coaxial cable, and client computers 21–24 each include cable modems for transmitting and receiving a data stream.

Headend 10 transmits (broadcasts) payload and auxiliary data streams which can be received by the plurality of client computers 21–24. To provide an upstream channel (i.e, a channel that permits data to be transmitted from client computers 21–24 to headend 10) headend 10 also remotely controls how client computers 21–24 access and transmit on transmission medium 30. Typically, Time Division Multiple Access ("TDMA") is used to provide the upstream channel.

With TDMA, each client computer transmits to headend 10 only during a specific time interval called a time slot. Client computers 21–24 keep track of time slot synchronization by maintaining and adjusting their internal clock reference, based on Media Access Control ("MAC") information broadcast by headend 10. The time slots are assigned to the client computers by a MAC function within headend 10.

As a result, client computer slot markers are synchronized to headend 10's master slot markers, which are based on a common system clock provided by the MAC function. Headend 10 transmits information about the nominal position and current sequential number of the slot markers in a special packet called a Timing Information Element ("TIE") packet.

When received by client computers 21–24 the TIE packet provides a time stamp of when it was generated based on the system clock. Each client computer 21–24 can synchronize its own slot marker from the information in the TIE packet.

Headend 10, which is a "data-only" headend, receives network data from a network data source 14, modulates a radio frequency (RF) carrier with a modulator 34, and transmits the resultant signal to the transmission medium 30. The network data, which is generated by Internet 12, is then received by client computers 21–24.

Network data source 14 generates packet data stream 32 and includes the system clock 20, a TIE packet generator 18 that generates TIE packets, and a data generator 16 that formats data packets received from Internet 12. Modulator 34 converts packet stream 32 generated by network data source 14 into the appropriate form (e.g., radio frequency) so that it can be transmitted on transmission medium 30.

For the upstream channel, additional functions performed by network data source 14 include upstream signal demodulation and reformatting data into a stream suitable for forwarding to Internet 12. The receive side of headend 10, which receives data streams transmitted from client computers 21–24, is not shown in FIG. 1.

When a TIE packet is transmitted to client computers 21–24 from headend 10, the TIE packet arrives at different times to each client computer 21–24 due to different propagation delays among the client computers. For example, client computer 24 will receive a TIE packet at a later time than client computer 21 because it is located at a further distance from headend 10. However, the delay to each client computer 21–24 is fixed because the delay due to modulator 34, transmission medium 30, and each client computer 21–24 does not change. Therefore, the delay can be measured and factored.

The delay can be determined by each client computer by comparing the TIE packet with a synchronization symbol sent from headend 10 to all client computers. The client computers then compensate for the delay when performing slot marker synchronization. A known procedure, referred to as "ranging", is used to adjust the synchronization in client computers 21–24 to compensate for the constant delay of any origin.

FIG. 2 is a block diagram that illustrates a typical multipurpose headend. In a multi-purpose headend, the data service and regular audio and video services may coexist on the same frequency channel if audio and video services are digital (e.g., as defined by the Digital Video Broadcaster's consortium ("DVB" under European Telecommunication Standards Institute ETS 300 429)) This allows bandwidth to be used economically and provides rich content services to subscribers (client computers). The network data stream may be either used to enhance the video stream (i.e., to provide additional on-screen information, to provide a database that may be accessed while watching sports, etc.), or used independently.

Multi-purpose headend 50 shown in FIG. 2 includes a video data source 40 that generates a video data stream and an audio data source 42 that generates an audio data stream. The data streams generated by video data source 40 and audio data source 42 typically are transmitted on the same transmission medium 30 as the data stream generated by network data source 14. One example of headend 50 is a headend that provides cable television and Internet access over the same coaxial cable.

In order to combine the three data streams generated by headend 50, the data streams are multiplexed together by a multiplexer 46 before being sent to modulator 34. However, multiplexer 46 multiplexes input data streams on a packet-by-packet basis and has to account for potentially variable data rates for each data source. Therefore, multiplexer 46 introduces a variable (and in most cases unknown) propagation delay due to the internal data buffering required to synchronize incoming data streams. The time delay for the TIE packets generated by network data source 14 to reach the client computers is no longer a fixed delay as it is for headend 10 of FIG. 1. Therefore, the ranging procedure cannot properly compensate for the delay when performing slot marker synchronization, and headend 50 cannot maintain the proper TDMA synchronization with the client computers.

Based on the foregoing, there is a need for a method and apparatus for allowing a headend which transmits a TDMA-based data stream multiplexed with other data streams to maintain TDMA synchronization with client computers.

SUMMARY OF THE INVENTION

One embodiment of the present invention is a data synchronization unit that provides Time Division Multiple Access (TDMA) synchronization for a headend. The headend includes a network data source and transmits a plurality of data streams on a transmission medium. Included in the plurality of data streams is a first timing element packet generated by the network data source. The plurality of data streams are multiplexed by a multiplexer into a combined data stream.

The data synchronization unit extracts the first timing packet from the combined data stream. The data synchronization unit then generates a second timing packet that compensates for a time delay of the multiplexer and inserts the second timing packet into the combined data stream in place of the first timing packet.

DETAILED DESCRIPTION

Figure 1:
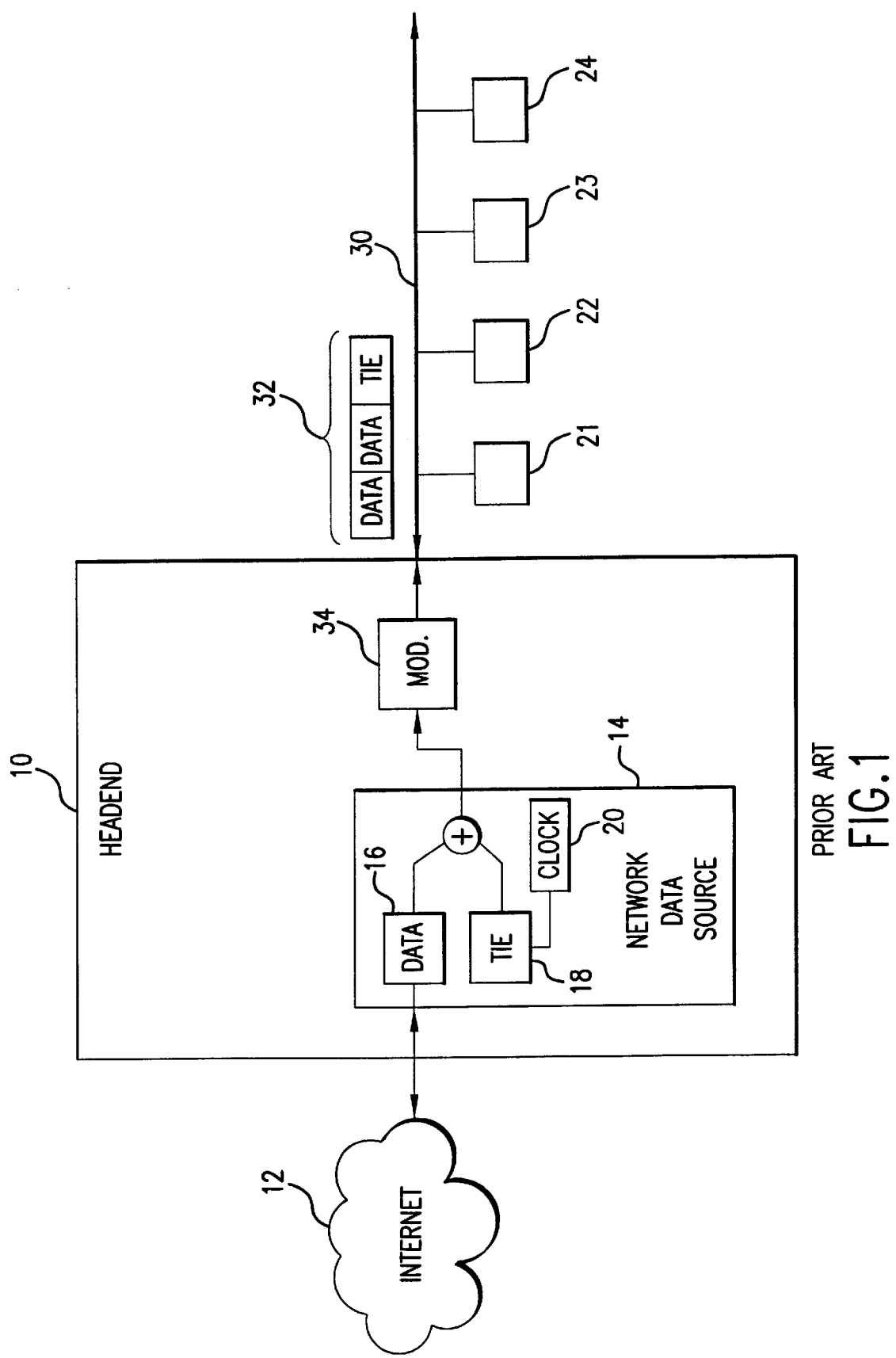
FIG. 1 is a block diagram that illustrates a typical headend for providing Internet access to a plurality of client computers.
Figure 2:
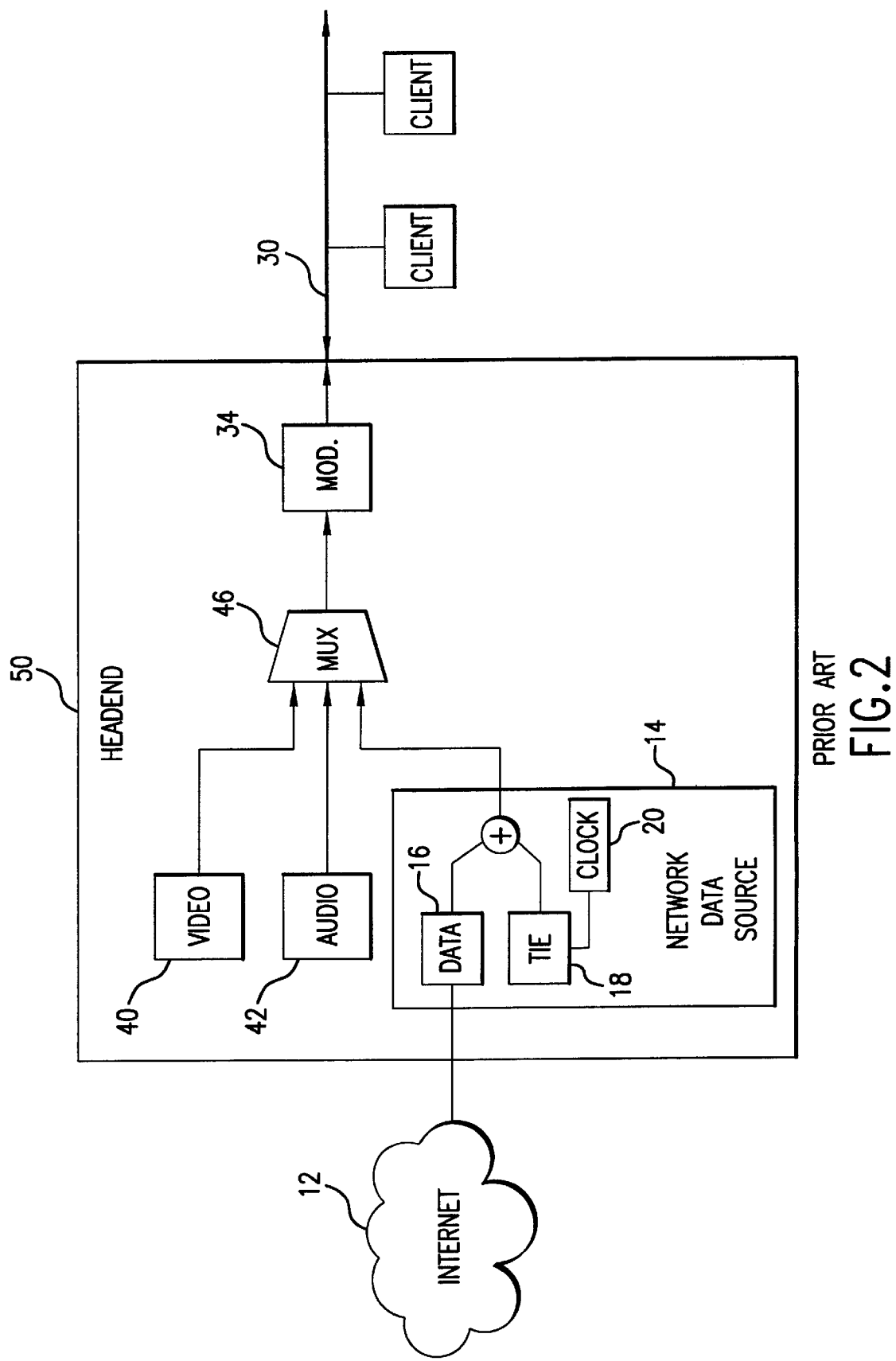
FIG. 2 is a block diagram that illustrates a typical headend that transmits multiple data streams.
Figure 3:
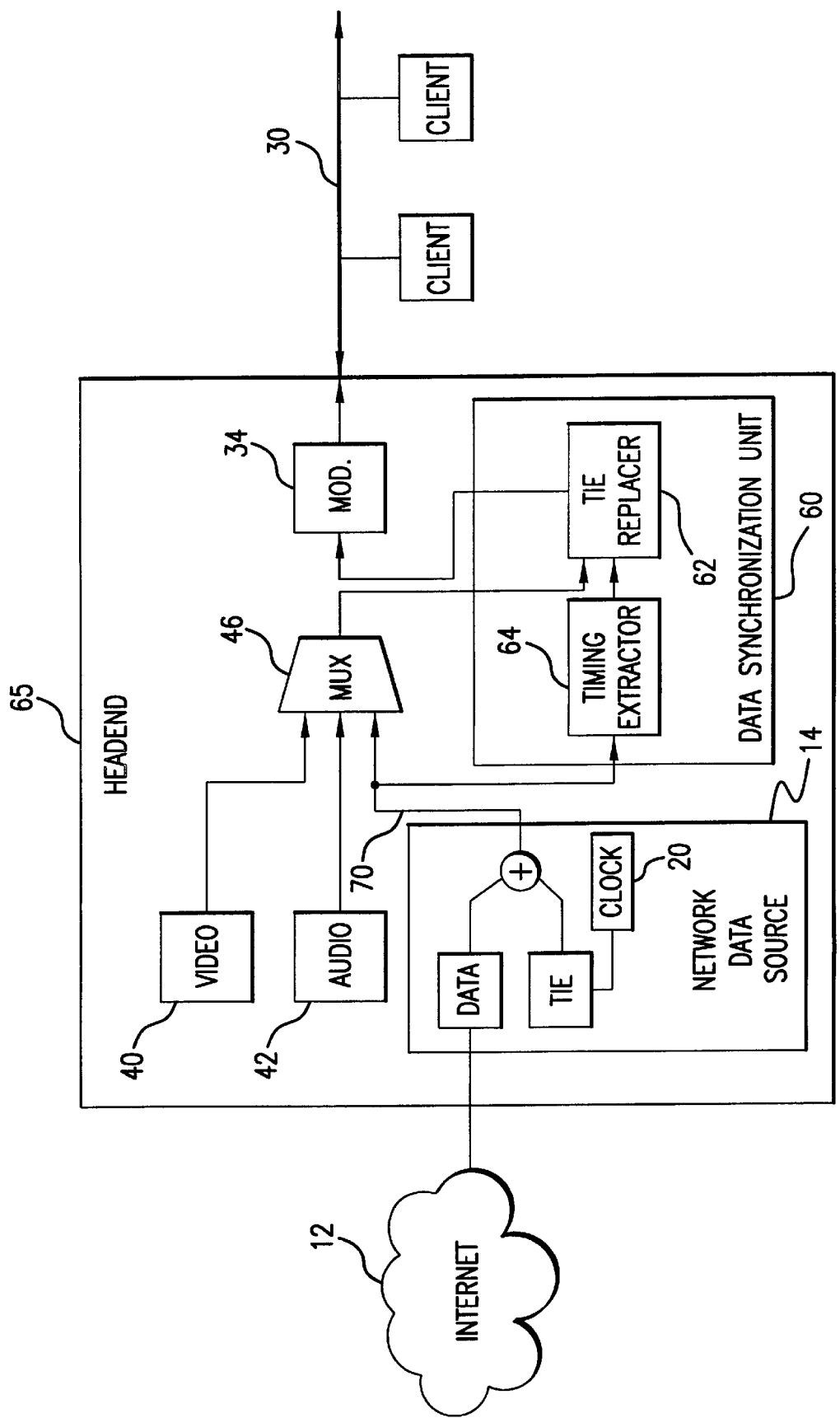
FIG. 3 is a block diagram illustrating a headend that includes a data synchronization unit in accordance with one embodiment of the present invention.

FIG. 3 is a block diagram illustrating a headend that includes a data synchronization unit in accordance with one embodiment of the present invention. Headend 65 in FIG. 3, like headend 50 in FIG. 2, includes network data source 14, video data source 40, audio data source 42, multiplexer 46 and modulator 34. Network data source 14 transmits data packet streams on transmission medium 30. In one embodiment, transmission medium 30 is an HFC cable, and data is transmitted to client computers by headend 65 using a Moving Picture Experts Group-2 ("MPEG-2") transport stream. MPEG-2 is disclosed in International Standards Organization ("ISO")/International Electrotechnical Commission ("IEC") 13818-1 (1996).

Data synchronization unit 60 includes a timing extractor 64 that extracts timing information from the packets sent by network data source 14. Timing extractor 64 is coupled to output path 70 of network data source 14. Timing extractor 64 includes its own local clock that is synchronized with system clock 20 when the timing information is extracted from the packets. The timing extraction and local clock synchronization by timing extractor 64 is similar to method used by each client computer to synchronize their local clock.

Data synchronization unit 60 further includes a TIE replacer 62 that replaces each TIE packet generated by network data source 14 with a new TIE packet that compensates for the variable delay caused by multiplexer 46. To restore correct timing, TIE replacer 62 is coupled to the output of timing extractor 64 and the output of multiplexer 46, which allows it to timestamp the actual moment when the TIE packet enters modulator 34. The output of TIE replacer 62 is routed to modulator 34.

Figure 4:
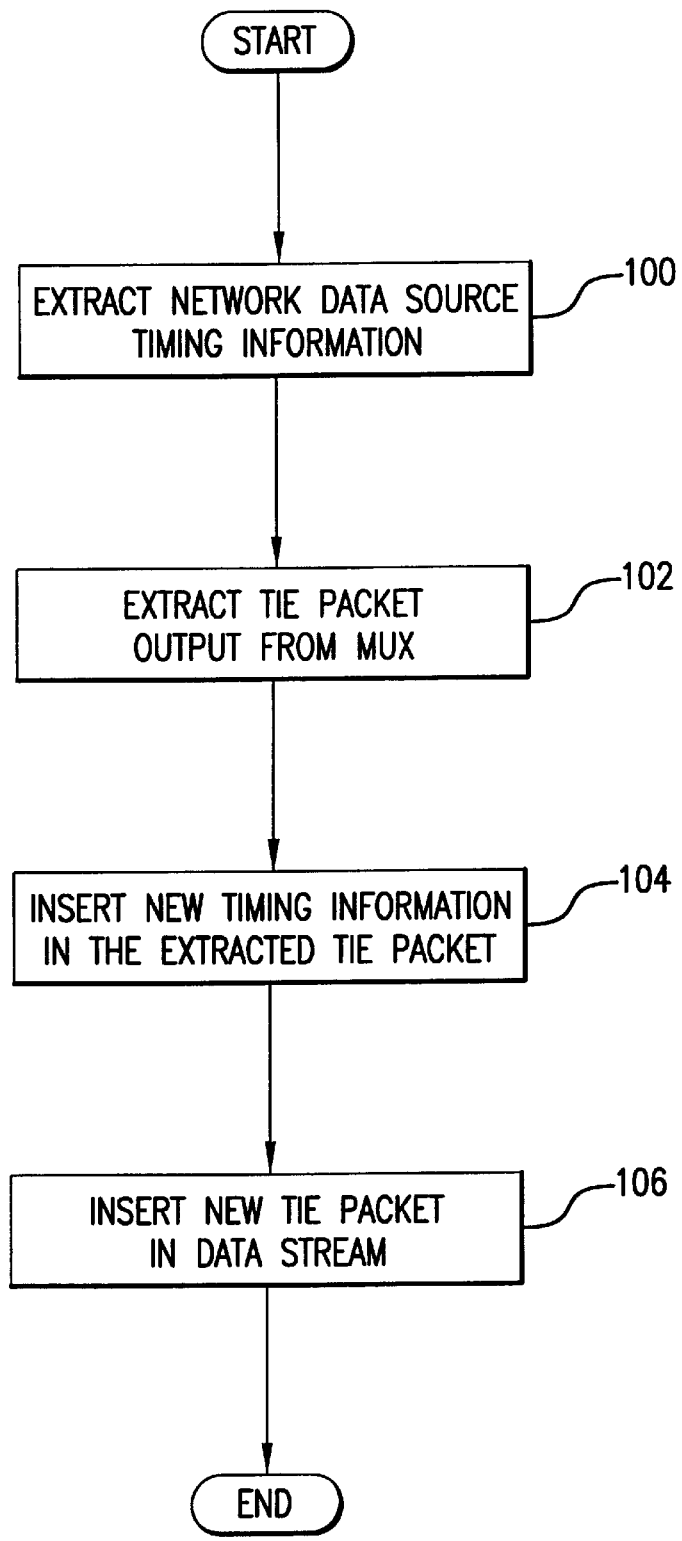
FIG. 4 is a flowchart of the steps performed by one embodiment of the data synchronization unit.

FIG. 4 is a flowchart of the steps performed by one embodiment of data synchronization unit 60. Data synchronization unit 60 can be implemented in software or hardware, or as a combination of software and hardware.

At step 100, timing extractor 64 extracts timing information from network data source 14 so that it is synchronized with system clock 20. Timing extractor 64 scans the packets transmitted on line 70 for TIE packets. When a TIE packet is found, timing extractor 64 reads the TIE packet and synchronizes its local clock and slot marker position in the same manner that a client computer performs slot marker synchronization. Step 100 is performed for every TIE packet transmitted on line 70.

At step 102 TIE replacer 62 scans the output of multiplexer 46 for the TIE packets. If a TIE packet is found, it is extracted from the data stream.

At step 104, TIE replacer 62 generates a new TIE packet by inserting new timing information in the TIE packet extracted at step 102. The timing information corresponds to the current state of data synchronization unit 60's local clock, and therefore represents the actual time when this particular TIE packet is presented to modulator 34. The result of step 104 is that the TIE packet is re-timestamped at the point in the transmission path beyond which the additional propagation delay is always constant. As a result, the new TIE packet references the slot marker to the synchronization symbol at the output of multiplexer 46, rather than the one at the input of multiplexer 46. The checksum of the new TIE packet is also updated as necessary.

Finally, at step 106 TIE replacer 62 inserts the new TIE packet into the data stream in place of the TIE packet extracted at step 102.

Steps 100–106 are performed "on the fly" without changing the sequence of the packets at the output of multiplexer 46.

The data stream is then output to modulator 34 where it is used to modulate an RF carrier. The modulated carrier is then transmitted to the client computers. The delay from data synchronization unit 60 is a fixed delay. Because the remaining delay in the system due to modulator 34, transmission medium 30 and the client computers is also fixed, it can now be compensated for with a typical ranging procedure, and the client computers can successfully synchronize markers with headend 65.

Figure 5:
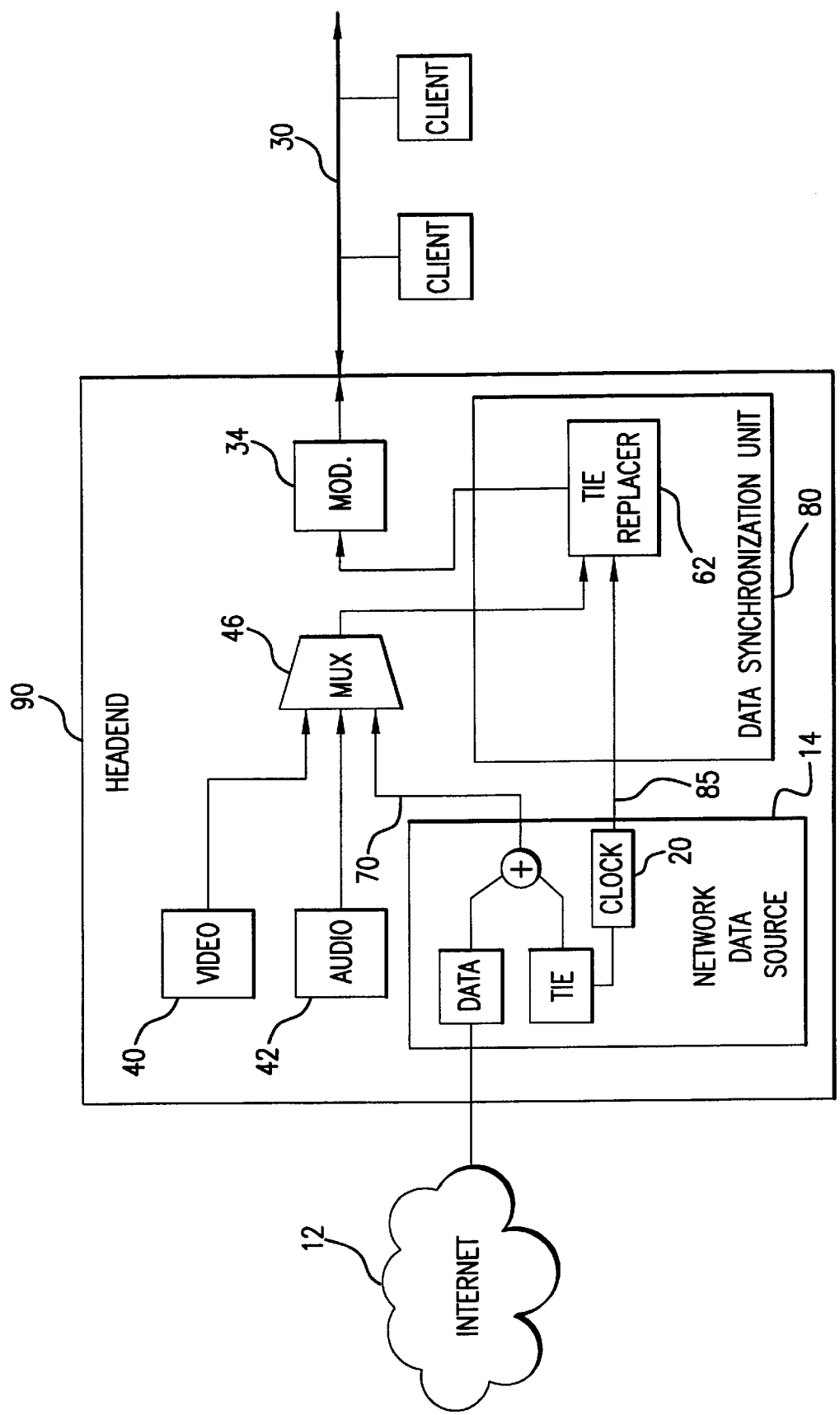
FIG. 5 is a block diagram illustrating a headend that includes a data synchronization unit in accordance with another embodiment of the present invention.

FIG. 5 is a block diagram illustrating a headend 90 that includes a data synchronization unit 80 in accordance with another embodiment of the present invention. Unlike data synchronization unit 60 of FIG. 3, data synchronization unit 80 does not include a timing extractor. Instead, TIE replacer 62 is coupled to the output of system clock 20 via a dedicated connection 85. There is no need for data synchronization unit 80 to have a local clock because timing information is derived directly from system clock 20. Data synchronization unit 80 executes steps 102, 104 and 106 shown in FIG. 4, but does not execute step 100. In all other aspects, headend 90 is identical to headend 65 of FIG. 3.

As described, the data synchronization unit replaces the TIE packets in the aggregate downstream to compensate for variable delays caused by the multiplexer. Therefore, the data synchronization unit allows a data headend to function with the multiplexed streams without any changes and without knowledge of the multiplexing technique, unless the total maximum delay inserted in the data path is less than the regular propagation delay it can compensate for.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although in the embodiment illustrated, an MPEG-2 transport stream is used to transmit the data stream to the client computers, other transport streams with multiplexed packets may also be used with the present invention such as Asynchronous Transport Mode ("ATM"), Internet Protocol ("IP") or Ethernet.

Further, an HFC cable two-way data communication system is illustrated. However, the present invention can apply to satellite two-way data communication systems, and any other TDMA-based communication systems (e.g., digital cellular communication systems).

What is claimed is:

1. A method of providing Time Division Multiple Access (TDMA) synchronization for a headend that transmits a plurality of data streams that are multiplexed by a multiplexer into a combined data stream, wherein the plurality of data streams include a first timing packet generated by a network data source, said method comprising the steps of:

(a) extracting the first timing packet from the combined data stream;

(b) generating a second timing packet that compensates for a time delay of the multiplexer; and (c) inserting the second timing packet into the combined data stream in place of the first timing packet at the output of the multiplexer and before the combined data stream is transmitted by the headend;

wherein steps (a)–(c) are executed by a data synchronization unit that is coupled to the network data source having a clock, and wherein said data synchronization unit uses said clock.

2. The method of claim 1, wherein step (b) comprises the step of inserting revised timing information in the first timing packet.

3. The method of claim 2, further comprising the step of extracting timing information from the network data source.

4. The method of claim 1, wherein the first timing packet is generated by a Media Access Control function and the first timing packet is a timing information element.

5. The method of claim 1, wherein the headend is a Hybrid Fiber/Coaxial cable network headend.

6. The method of claim 1, wherein the headend transmits the combined data stream using a Moving Picture Experts Group-2 transport stream.

7. The method of claim 1, wherein the headend transmits the combined data stream using an Asynchronous Transport Mode transport stream.

8. A data synchronization unit adapted to provide Time Division Multiple Access (TDMA) synchronization for a headend that includes a network data source having a clock, and transmits a plurality of data streams on a transmission medium, wherein the plurality of data streams are multiplexed by a multiplexer into a combined data stream and include a first timing packet generated by the network data source, said data synchronization unit comprising:

a timing packet replacer having a first input coupled to said clock of the network data source, a second input coupled to an output of the multiplexer, and an output coupled to the transmission medium;

wherein said timing packet replacer extracts the first timing packet from the combined data stream, generates a second timing packet that compensates for a time delay of the multiplexer using said clock of the network data source, and inserts the second timing packet into the combined data stream in place of the first timing packet at the output of the multiplexer and before the combined data stream is transmitted by the headend.

9. The data synchronization unit of claim 8, wherein the plurality of data streams comprise a video stream and an Internet data stream.

10. The data synchronization unit of claim 8, wherein the first timing packet is generated by a Media Access Control function and the first timing packet is a timing information element.

11. The data synchronization unit of claim 8, wherein the headend is a Hybrid Fiber/Coaxial cable network headend.

12. The data synchronization unit of claim 8, wherein the headend transmits the combined data stream using a Moving Picture Experts Group-2 transport stream.

13. The data synchronization unit of claim 8, wherein the headend transmits the combined data stream using an Asynchronous Transport Mode transport stream.

14. A headend adapted to transmit a plurality of data streams on a transmission medium comprising:

a network data source that generates at least one of the plurality of data streams, and comprises a clock, wherein said at least one data streams include a first timing packet;

a multiplexer coupled to said network data source that multiplexes the plurality of data streams into a combined data stream; and a data synchronization unit coupled to said multiplexer and said network data source, wherein said data synchronization unit provides Time Division Multiple Access (TDMA) synchronization for said headend, said data synchronization unit comprising:

a timing packet replacer having a first input coupled to said clock, a second input coupled to an output of the multiplexer, and an output coupled to the transmission medium;

wherein said timing packet replacer extracts the first timing packet from the combined data stream, generates a second timing packet that compensates for a time delay of the multiplexer using said clock of the network data source, and inserts the second timing packet into the combined data stream in place of the first timing packet at the output of the multiplexer and before the combined data stream is transmitted by the headend.

15. The headend of claim 14, wherein the plurality of data streams comprise a video stream, an audio stream, and a network data stream.

16. The headend of claim 14, wherein the first timing packet is generated by a Media Access Control function and the first timing packet is a timing information element.

17. The headend of claim 14, wherein the headend is a Hybrid Fiber/Coaxial cable network headend.

* * * * *